United States Patent [19]

Morikawa

[11] Patent Number: 5,058,547
[45] Date of Patent: Oct. 22, 1991

[54] WARNING SYSTEM FOR NOZZLE CLOG OF A FUEL INJECTOR

[75] Inventor: Koji Morikawa, Tokyo, Japan
[73] Assignee: Fuji Jukogyo Kabushiki Kaisha, Tokyo, Japan
[21] Appl. No.: 660,438
[22] Filed: Feb. 22, 1991
[30] Foreign Application Priority Data
  Feb. 28, 1990 [JP] Japan .............................. 2-19616[U]
[51] Int. Cl.$^5$ .............................................. F02B 77/00
[52] U.S. Cl. .............................. 123/198 D; 73/119 A
[58] Field of Search .......... 123/198 D; 73/116, 119 A
[56] References Cited
FOREIGN PATENT DOCUMENTS
  60-67745  4/1985  Japan .
  60-79135  5/1985  Japan .
  60-93152  5/1985  Japan .

Primary Examiner—Noah P. Kamen
Attorney, Agent, or Firm—Martin A. Farber

[57] ABSTRACT

An automotive engine has a fuel injector provided for injecting fuel directly in a cylinder of the engine. A control unit has a calculator for producing a basic fuel injection pulse width signal. Engine speed at idling state is compared with a desired idle speed and a correcting pulse width is produced. The basic pulse width signal is corrected with the correcting pulse so as to converge the idle speed to the desired idle speed. The correcting pulse width is compared with a reference pulse width and an alarm signal is generated when the correcting pulse width is larger than the reference pulse width. In response to the alarm signal, an alarm is operated to warn the nozzle clog.

5 Claims, 4 Drawing Sheets

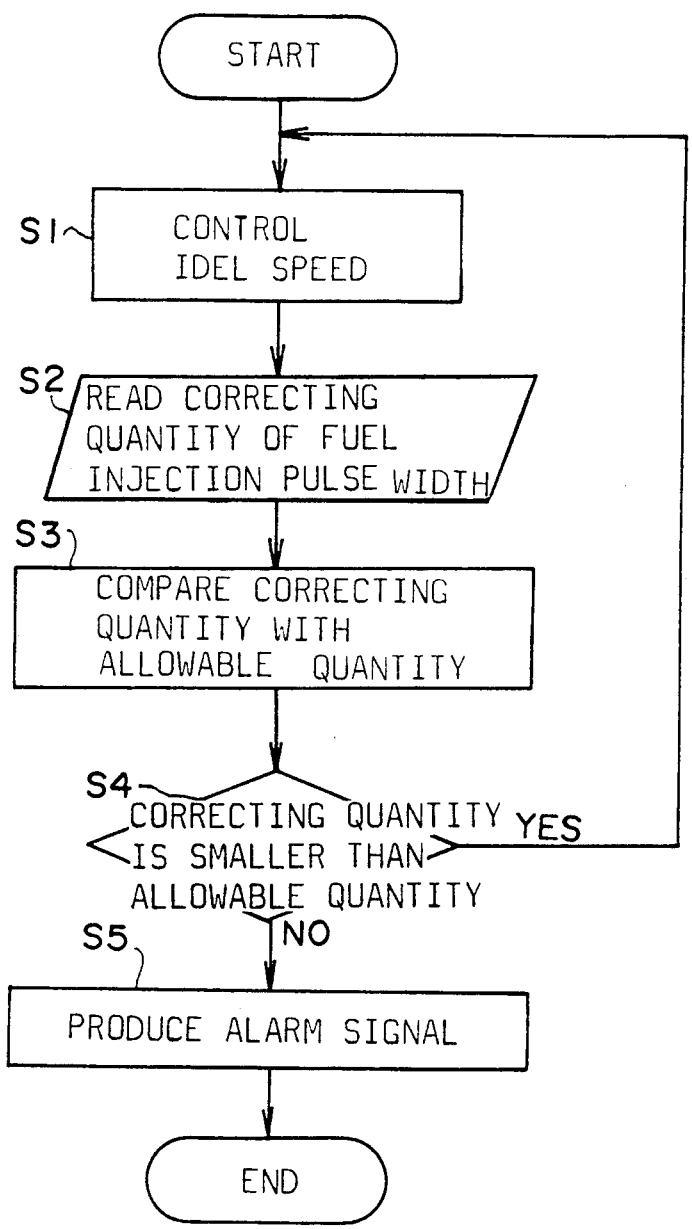

WARNING SYSTEM FOR NOZZLE CLOG OF A FUEL INJECTOR

BACKGROUND OF THE INVENTION

The present invention relates to an alarm system for alarming a clog of a fuel injector nozzle used in an engine for a motor vehicle.

In a known fuel injection system, a fuel injector is provided in an intake manifold so as to inject fuel into cylinders. Further, in order to provide charge stratification in the cylinder and ensure stable combustion in light and middle load ranges of engine operations, the engine with a direct fuel injection system is currently developed. In the system, the fuel is directly injected into a combustion chamber of the cylinder.

The fuel injector injects the fuel from the nozzle in accordance with a fuel injection pulse width signal fed from a fuel injection control system.

In the direct fuel injection system, since the nozzle of the fuel injector is exposed in the combustion chamber, the nozzle is liable to be clogged with carbon sticking thereto.

In order to solve the problem, in the former system where the fuel is injected into the intake manifold, it has been proposed to provide at least two fuel injectors in order to prevent reduction of fuel injection quantity caused by the nozzle clog. Japanese Patent Applications Laid-Open 60-67745, 60-79135, and 60-93152 disclose such a system.

However, in the direct fuel injection system, it is difficult to provide space for the two fuel injectors in each cylinder. If the nozzle of the fuel injector is clogged with carbon, the quantity of the fuel reduces. In the worst case, the fuel injection stops and the engine stalls.

SUMMARY OF THE INVENTION

The object of the present invention is to provide an alarm system for warning before clogging a nozzle of a fuel injector.

According to the present invention, there is provided a system for warning a nozzle clog of a fuel injector provided in an engine, the system having, detector means for detecting engine operating conditions, engine speed detector means for detecting engine speed and for producing an engine speed signal, desired idle setting means for providing a desired idle speed, first calculator means responsive to the engine operating conditions for calculating quantity of fuel injected from the fuel injector and for producing a basic fuel injection pulse width based on the calculated quantity, first comparator means for comparing an idle engine speed with the desired idle speed and for producing a correcting pulse width for idling, second calculator means for correcting the basic fuel injection pulse width with the correcting pulse width so as to converge the idle speed on the desired idle speed.

The system comprises storing means for storing the correcting pulse width for idling, second comparator means for comparing the stored correcting pulse width with a reference pulse width and for producing an alarm signal when the stored correcting pulse width is larger than the reference pulse width, and alarm means responsive to the alarm signal for warning the nozzle clog.

In an aspect of the inventions, the fuel injector is provided for injecting the fuel directly into the cylinder.

Other objects and features of the present invention will become understood from the following description with reference to the accompanying drawings.

BRIEF DESCRIPTION OF DRAWINGS

FIG. 3 is a flowchart showing an operation of the system.

DETAILED DESCRIPTION OF THE PREFERRED EMBODIMENT

Figure 1:
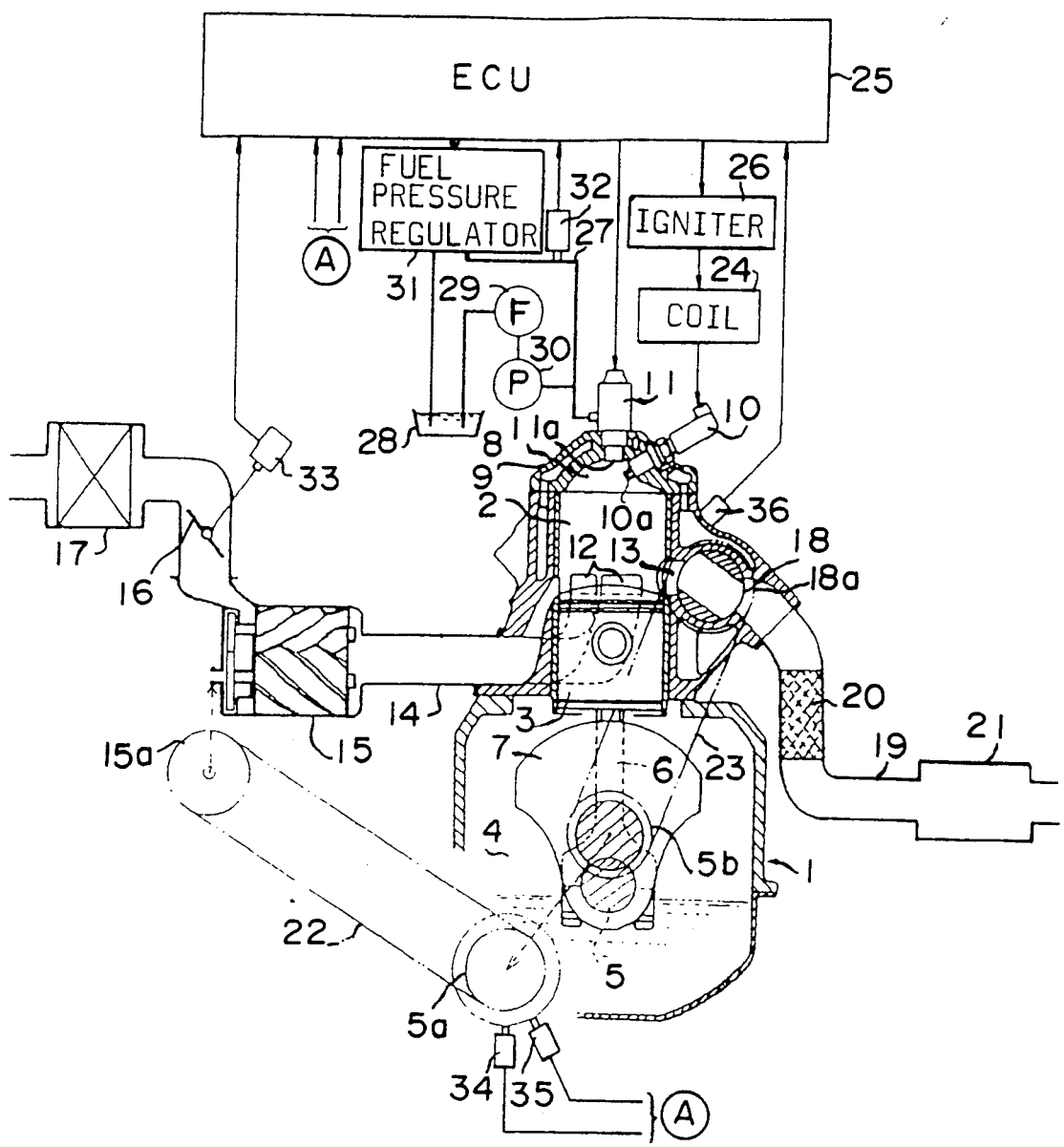
FIG. 1 is a schematic diagram of a two-cycle engine to which the present invention is applied.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce inertia of the piston 3 reciprocating in the cylinder 2.

In a wall of the cylinder 2, an exhaust port 13 and a scavenge port 12 are formed in 90 degrees angular disposition or opposing one another. The ports 12 and 13 are adapted to open at a predetermined timing with respect to a position of the piston 3.

A fuel injector 11 and a spark plug 10 are provided on a top of a combustion chamber 8 formed in a cylinder head 9. A nozzle 11a of the fuel injector 11 is opened to a top of the combustion chamber 8. An electrode 10a of the spark plug 10 is provided under the nozzle 11a to achieve the charge stratification.

The engine 1 is supplied with air through an air cleaner 17, a throttle valve 16, a displacement scavenge pump 15 and a scavenge pipe 14.

A rotary exhaust valve 18 is provided in an exhaust pipe 19 downstream of the exhaust port 13 adjacent thereto. Exhaust gas is discharged from the engine 1 through the exhaust port 13, an exhaust pipe 19 having a catalytic converter 20 and a muffler 21.

The scavenge pump 15 is a displacement pump such as a Lysholm pump (helical lobe position displacement pump). The scavenge pump 15 is operatively connected to the crankshaft 5 through a transmitting device 22 comprising an endless belt running over a crank pulley 5a of the crankshaft 5 and a pump pulley 15a of the scavenge pump 15. The scavenge pump 15 is driven by the crankshaft 5 through the transmitting device 22.

The rotary exhaust valve 18 comprises a rotary valve body 18a operatively connected with the crankshaft 5 through a pulley and belt device comprising a crank pulley 5b and a belt 23 so as to be driven by the engine 1.

An ignition coil 24 is connected to the electrode 10a of the spark plug 10. Ignition voltage is controlled by an igniter 26 connected to an electronic control unit 25 in accordance with an ignition signal from the control unit 25.

The fuel injector 11 comprises a solenoid operated plunger and a needle valve secured to the plunger which is provided to open the nozzle 11a. When the solenoid operated plunger is shifted, the needle valve is moved to open the nozzle 11a for a period determined by a fuel injection pulse width. Thus, a predetermined quantity of fuel is injected through the nozzle 11a.

The fuel in a fuel tank 28 is supplied to the injector 11 through a fuel passage 27 having a filter 29, a pump 30 and a fuel pressure regulator 31 for constantly maintaining the fuel at a predetermined low fuel pressure.

The fuel pressure regulator 31 is supplied with a pressure regulating signal from the control unit 25 for controlling the fuel pressure corresponding to the input signal. A pressure sensor 32 is provided in the fuel passage 27 downstream of the pressure regulator 31 for detecting pressure of the fuel to be injected. The detected fuel pressure is fed back to the control unit 25 for feedback control. The engine 1 is further provided with a throttle position sensor 33 for detecting a throttle opening degree, a crank angle sensor 34, a cylinder discriminating sensor 35 and a coolant temperature sensor 36.

Output signals from the sensors 33, 34, 35, 36 are supplied to the control unit 25 which feeds an ignition signal, and a fuel injection pulse signal to the spark plug 10 and the injector 11, respectively.

Figure 2A:
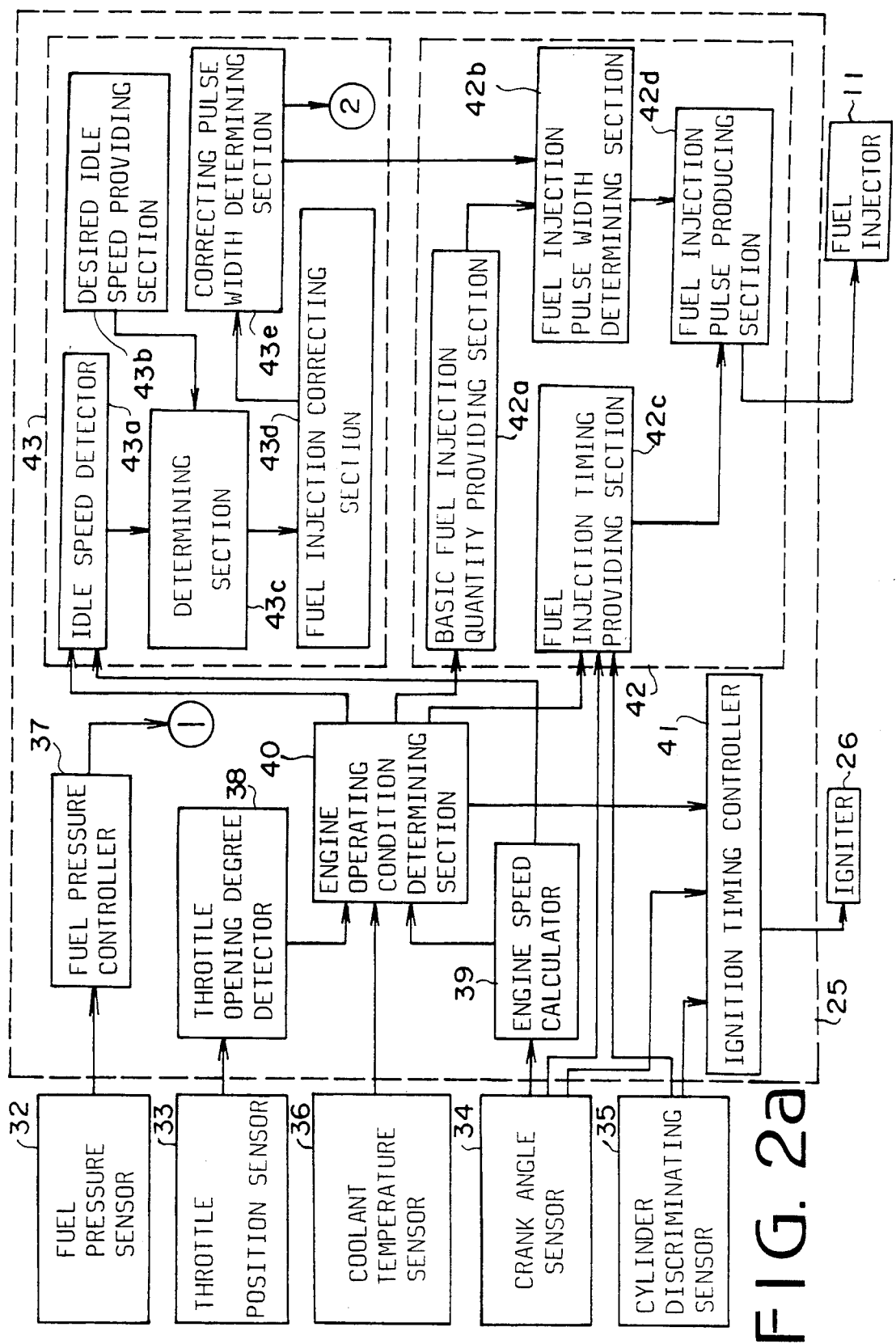
FIGS. 2a and 2b are block diagrams showing a control system according to the present invention.
Figure 2B:
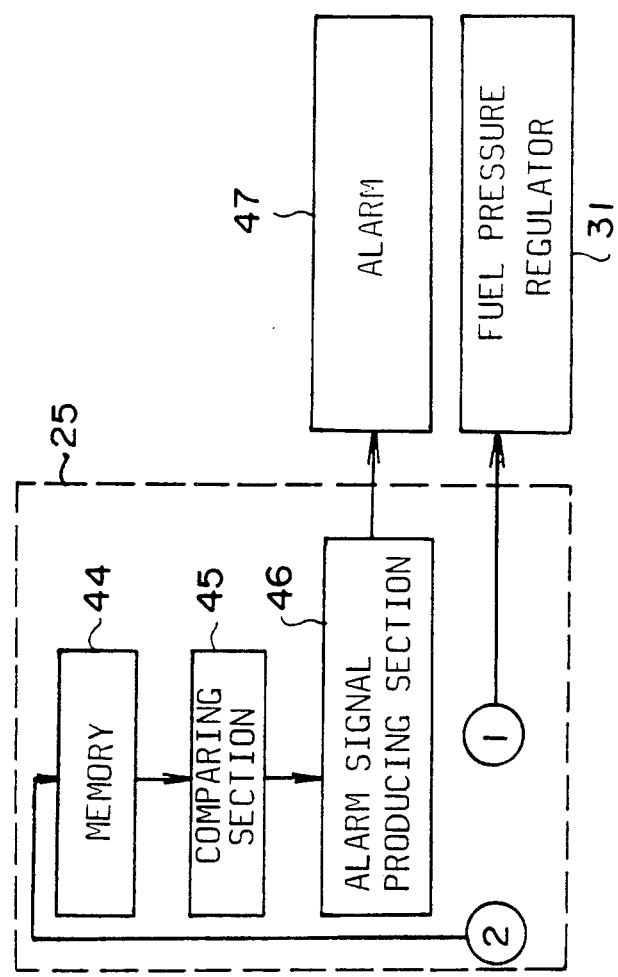

Referring to FIGS. 2a and 2b, the control unit 25 is provided with a fuel pressure controller 37 to which the pressure of the fuel from the pressure sensor 32 is applied. The controller 37 produces a predetermined pressure regulating signal which is applied to the pressure regulator 31. An output signal from the throttle position sensor 33 is applied to a throttle opening degree detector 38 for detecting a throttle valve opening degree. A crank angle signal detected by the crank angle sensor 34 is applied to an engine speed calculator 39 for calculating engine speed. The throttle opening degree from the throttle opening degree detector 38, the engine speed from the engine speed calculator 39 and a coolant temperature detected by the coolant temperature sensor 36 are applied to an engine operating condition determining section 40 for determining engine operating condition. An output signal of the engine operating condition determining section 40 is applied to an ignition timing controller 41, a basic fuel injection controller 42, and an idle speed controller 43.

The ignition timing controller 41 is further applied with the output signals from the crank angle sensor 34 and the cylinder discriminating sensor 35 for determining a proper ignition timing. A determined ignition timing signal is applied to the igniter 26.

The basic fuel injection controller 42 is provided with a basic fuel injection quantity providing section 42a which calculates a basic quantity of injected fuel in dependency on the engine operating conditions from the section 40. The basic fuel quantity is applied to a fuel injection pulse width determining section 42b in which the basic fuel quantity is converted into a fuel injection pulse width. The fuel injection pulse width signal is applied to a fuel injection pulse producing section 42d.

The output signals from the section 40 and sensors 34 and 35 are further applied to a fuel injection timing providing section 42c in which a fuel injection timing is determined in accordance with the input signals. The fuel injection timing is applied to the section 42d. The section 42d produces a pulse signal having a predetermined pulse width at a fuel injection timing which is applied to the fuel injector 11 for injecting the fuel from the injector 11 at a predetermined timing.

The idle speed controller 43 is provided with an idle speed detector 43a to which the engine speed from the calculator 39 and the engine operating condition signal from the section 40 are applied for detecting an actual idle speed. The idle speed is applied to a determining section 43c which is applied with a desired idle speed provided from a desired idle speed providing section 43b. The determining section 43c compares the actual idle speed and the desired idle speed and determines a difference between the actual idle speed and the desired idle speed. The difference from determining section 43c is applied to a fuel injection correcting section 43d in which a correcting quantity of the fuel corresponding to the difference is determined. The correcting quantity is applied to a correcting pulse width determining section 43e which determines a correcting pulse width of the fuel injection. The correcting pulse width is applied to the fuel injection pulse width determining section 42b for correcting the fuel injection pulse width based on the difference, thereby maintaining the idle speed to the desired idle speed.

The control unit 25 is further provided with a memory 44, a comparing section 45 and an alarm signal producing section 46 for warning prior to the nozzle clog 11a of the fuel injector 11.

The memory 44 is applied with the correcting quantity from the correcting pulse width determining section 43e of the idle speed controller 43. The correcting quantity is stored in the memory 44 and the stored value is applied to the comparing section 45.

The comparing section 45 is provided with an allowable reference correcting quantity in a proper range for correcting quantity. In the section 45, the . actual correcting quantity stored in the memory 44 is compared with the allowable reference correcting quantity. When the actual correcting quantity is larger than the reference correcting quantity, the section 45 produces a signal which is applied to the alarm signal producing section 46. The section 46 produces an alarm signal based on the input signal for operating an alarm 47.

The alarm 47 is mounted on a dash board of the motor vehicle adjacent a driver's seat and composed of an alarm lamp or an alarm buzzer.

Describing the operation of the two-cycle engine, when the engine 1 starts, air is supplied to the cylinder 2 by the scavenge pump 15 through the air cleaner 17.

When the piston reaches a position close to the bottom dead center, the scavenge port 12 and the exhaust port 13 open so that intake air is delivered by the scavenge pump 15 into the cylinder 2 through the scavenge port 12. Consequently, burned gas remained in the cylinder 2 is scavenged so that the fresh intake air is admitted therein in a short time.

During the compression stroke, the piston 3 ascends and closes both ports 12 and 13.

A small amount of the fuel accumulated in the fuel injector 11 in accordance with the fuel injection pulse width signal from the basic fuel injection controller 42 of the control unit 25 is injected from the injector 11 and mixed with the fresh air. The mixture is ignited by the spark plug 10 immediately before the top dead center through the igniter 26 in accordance with the ignition timing signal from the ignition timing controller 41 of the control unit 25. Then, the fuel is injected at a predetermined desired timing and with a pulse width for performing charge stratification.

After explosion, the piston 3 descends for power stroke. Accordingly, the exhaust port 13 is opened so that the burned gas in the cylinder 2 which is still under high pressure escapes. The piston 3 further descends, thereby returning to the afore-described intake stroke where the cylinder 2 is scavenged.

Describing the operation of the control unit 25, the fuel pressure controller 37 produces the predetermined pressure regulating signal corresponding to the output signal from the pressure sensor 32 for operating the pressure regulator 31. Thus, the fuel injector 11 is controlled to inject a predetermined amount of the fuel corresponding to the pulse width of the fuel injection pulse signal.

The engine operating condition determining section 40 produces a determining signal of the engine operating condition such as warming up condition, idling state, light load, or heavy load based on the detected signals by the coolant temperature sensor 36, the throttle opening degree detector 38, and the engine speed calculator 39.

The ignition timing controller 41 operates to ignite the spark plug 10 of each cylinder at a proper timing for the engine operating condition in accordance with the determining signal.

The basic fuel injection controller 42 determines a proper quantity of fuel and a proper timing of fuel injection responsive to the engine operating conditions corresponding to the determining signal and produces the fuel injection pulse signal for operating the fuel injector 11 of each cylinder.

The idle speed controller 43 detects the idle speed at the idling state of the engine in response to the determining signal and compares the idle speed with the desired idle speed. The fuel injection correcting quantity is determined in accordance with the difference between the actual idle speed and the desired idle speed. The fuel injection pulse width is corrected in accordance with the pulse width corresponding to the correcting quantity, so that the idle speed is maintained at the desired idle speed.

Since the nozzle 11a of the fuel injector 11 is provided in the combustion chamber 8, the nozzle 11a is clogged with carbon, causing reduction of the quantity of fuel injected in the combustion chamber. Consequently, the output power of the engine decreases.

When the opening area of the nozzle 11a reduces with carbon, even if the fuel injection pulse producing section 42d produces the pulse signal of the normal pulse width, the quantity of the fuel injected from the fuel injector 11 reduces. As a result, the idle speed slows down at idling state.

Thus, in order to maintain the desired idle speed, the correcting pulse width determining section 43e operates to correct the pulse width of the fuel injection pulse. Consequently, the correcting quantity is increased corresponding to the decrease of the opening area of the nozzle 11a. When the correcting quantity exceeds a predetermined allowable reference correcting quantity, it is determined that the fuel injector 11 is improper to be used thereafter.

The operation for warning will be described hereinafter with reference to the flowchart of FIG. 3.

At a step S1, the idle speed is controlled by the idle speed controller 43. At a step S2, the memory 44 reads the correcting quantity of the pulse width from the correcting pulse width determining section 43e and stores it therein.

At a step S3, the comparing section 45 compares the actual correcting quantity with the allowable reference correcting quantity. At a step S4, it is determined whether the actual correcting quantity is smaller than the allowable reference correcting quantity or not.

If the answer is yes, the program returns to the step S1. If not, the program goes to a step S5 where the alarm signal producing section 46 produces the alarm signal in accordance with the output signal from the comparing section 45 for operating the alarm 47.

Thus, an improper state of the fuel injector 11 is warned.

In accordance with the present invention, since the driver is informed that the nozzle of the fuel injector is in improper state before the clogging of the nozzle, stall of the engine can be prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A warning system for nozzle clog of a fuel injector provided in an engine, the system having detector means for detecting engine operating conditions, engine speed detector means for detecting engine speed and for producing an engine speed signal, desired idle setting means for providing a desired idle speed, first calculator means responsive to the engine operating conditions for calculating quantity of fuel injected from the fuel injector and for producing a basic fuel injection pulse width based on the calculated quantity, first comparator means for comparing idle engine speed with the desired idle speed and for producing a correcting pulse width for idling, second calculator means for correcting said basic fuel injection pulse width with the correcting pulse width so as to converge the idle speed on the desired idle speed, an improvement of the system which comprises:

second comparator means for comparing the correcting pulse width with a reference pulse width and for producing an alarm signal when the correcting pulse width is larger than the reference pulse width; and alarm means responsive to the alarm signal for warning nozzle clog.

2. The system according to claim 1, wherein said engine operating condition detector means comprises a throttle position sensor, and a coolant temperature sensor.

3. The system according to claim 1, wherein said engine speed detector means comprises a crank angle sensor and an engine speed calculator.

4. The system according to claim 1, wherein said fuel injector is provided for injecting fuel directly into a cylinder.

5. The system according to claim 1, wherein said second comparator means comprises storing means for storing said correcting pulse width to compare with said reference pulse width.

* * * * *